(12) United States Patent
Chiang

(10) Patent No.: US 6,485,215 B1
(45) Date of Patent: Nov. 26, 2002

(54) ARM CONNECTION APPARATUS FOR AN ARTIFICIAL MODEL

(76) Inventor: Jung-Chang Chiang, 4F-1, No. 100, Tien-Yu Street, Taipei (TW)

(*) Notice: Subject to any disclaimer, the term of this patent is extended or adjusted under 35 U.S.C. 154(b) by 15 days.

(21) Appl. No.: 09/891,211

(22) Filed: Jun. 25, 2001

(51) Int. Cl.$^7$ .............................. F16C 11/00; F16D 1/12
(52) U.S. Cl. ...................... 403/78; 403/104; 446/376
(58) Field of Search .................... 403/52, 59, 54, 403/66, 78, 84, 103, 104, 107; 446/375, 376, 383, 378, 390

(56) References Cited

U.S. PATENT DOCUMENTS

| | | | | |
|---|---|---|---|---|
| 2,572,285 A | * | 10/1951 | Schumacher et al. | 403/52 X |
| 3,277,601 A | * | 10/1966 | Ryan | 446/378 |
| 3,699,715 A | * | 10/1972 | Lewis et al. | 446/376 |
| 3,716,942 A | * | 2/1973 | Garcia et al. | 446/375 |
| 4,619,540 A | * | 10/1986 | Day et al. | 403/24 |
| 5,380,233 A | * | 1/1995 | Numoto | 403/59 |

* cited by examiner

Primary Examiner—Robert J. Sandy
(74) Attorney, Agent, or Firm—Connolly Bove Lodge Hutz

(57) ABSTRACT

An arm connection apparatus for an artificial model comprises two flat bases, a lock disk, a lock bolt, and a fixing disk. Each base has a recess hole with a contour composed of circular arc parts to join with a lock hole of the lock disk and a polygon lock part on the lock bolt such that an arm of the artificial model can be detachably connected to a shoulder part thereof easily and firmly. Next, the arm can be arranged to connect with the shoulder part in different positions by way of a changeable engagement between the lock hole and the polygon lock part. Moreover, it is possible to adjust the orientation of the lock hole by way of changing the angular position of the lock disk during being attached to the base to make the arm be a point of load while the model is hung up. Due to the parts of the connection apparatus being made in accordance with a standardized specification, the replacement with regard to parts or the arm it self can be performed directly such that the maintenance or repair for the connection apparatus becomes much easier and more convenient.

7 Claims, 7 Drawing Sheets

ARM CONNECTION APPARATUS FOR AN ARTIFICIAL MODEL

BACKGROUND OF THE INVENTION

1. Field of the Invention

The present invention relates to an arm connection apparatus for an artificial model, and, particularly, to a connection apparatus, which is possible for an arm of the artificial model to detachably connect with the shoulder part thereof easily and firmly.

2. Description of Related Art

For a clothes maker, the artificial model is an indispensable tool for a fashion exhibition. In order to put the clothes on the model easily, it is unavoidable that the model is separated into parts. Specifically, the arm thereof is one of the parts has to be detached often during the clothes being put on.

Normally, the conventional arm connection device is a fixing stick to engage with the shoulder of the artificial model. Although the conventional arm connection device can perform a basic effect of joining the arm to the shoulder part, it may meet a great resistance force as soon as the fixing stick is inserted into the shoulder part such that it is hard for the arm to be taken out afterward. Next, it is not possible for the conventional arm connection device to adjust the posture of the arm without the assistance of other devices while a changeable position of the arm is required. Otherwise, it is very easy for the arm to loosen and fall apart from the main body of the model. In addition, it is not possible for the conventional arm connection device to be adjusted for the tightness thereof. Moreover, it is very inconvenient that the entire model or the arm itself has to be carried to the repair shop for fixing in case of being out of order or damaged.

SUMMARY OF THE INVENTION

A main object of the present invention is to provide an arm connection apparatus for an artificial model, which can detachably join to the shoulder part of the model easily and firmly with an adjustable tightness.

Another object of the present invention is to provide an arm connection apparatus for an artificial model, which is possible to change the posture of the arm as required or to perform a point of load during being hung up.

A further object of the present invention is to provide an arm connection apparatus for an artificial model, which has the parts thereof be made in accordance with the standard specification so that the replacement or the maintenance of any part thereof or the arm itself can be performed easily.

BRIEF DESCRIPTION OF THE DRAWINGS

The other objects and features of the present invention can be more fully understood by reference to the following description of preferred embodiments and accompanying drawing, in which.

DETAILED DESCRIPTION OF THE PREFERRED EMBODIMENTS

Figure 1:
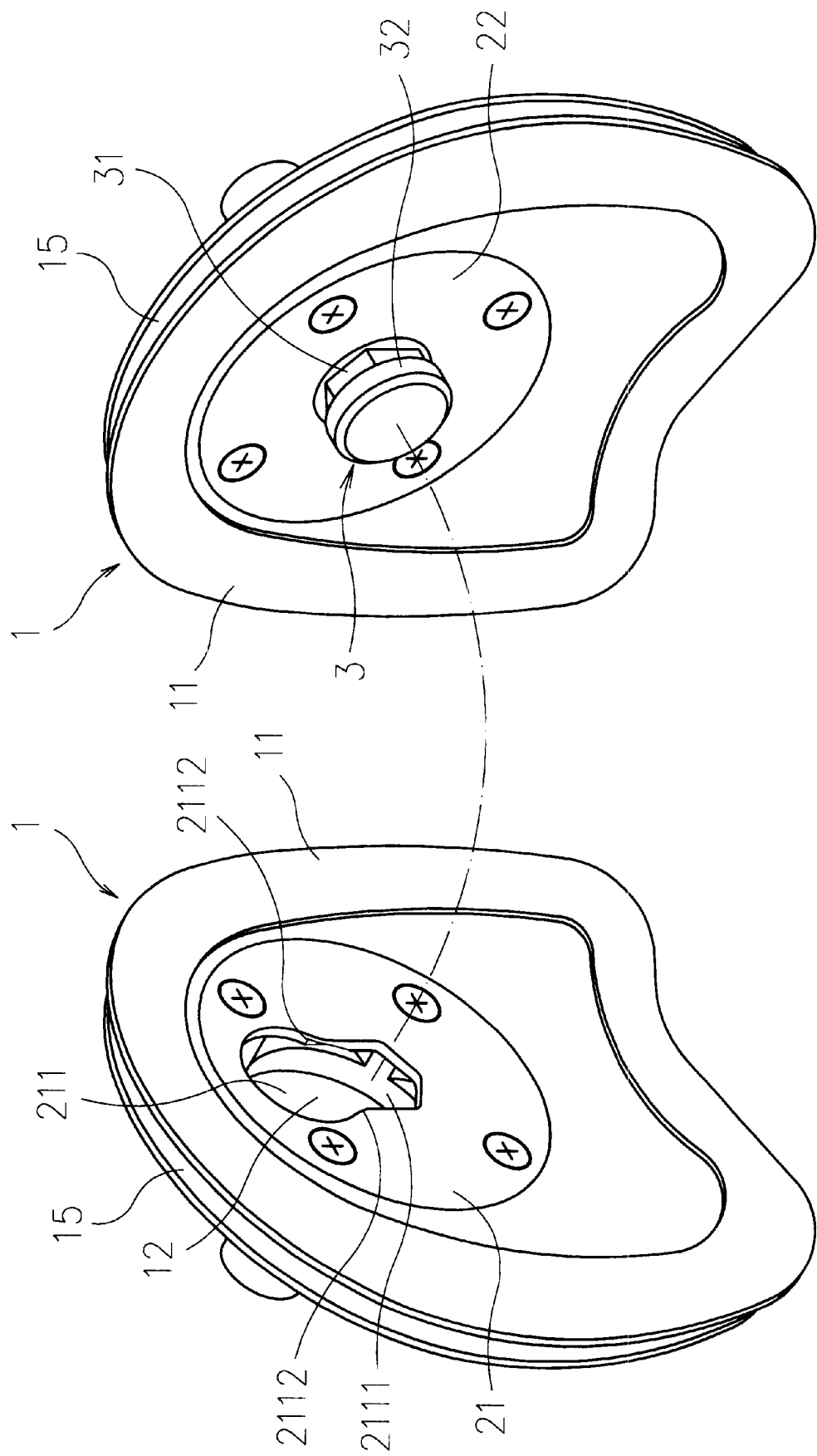
FIG. 1 is a perspective view of an arm connection apparatus for an artificial model according to the present invention.
Figure 2:
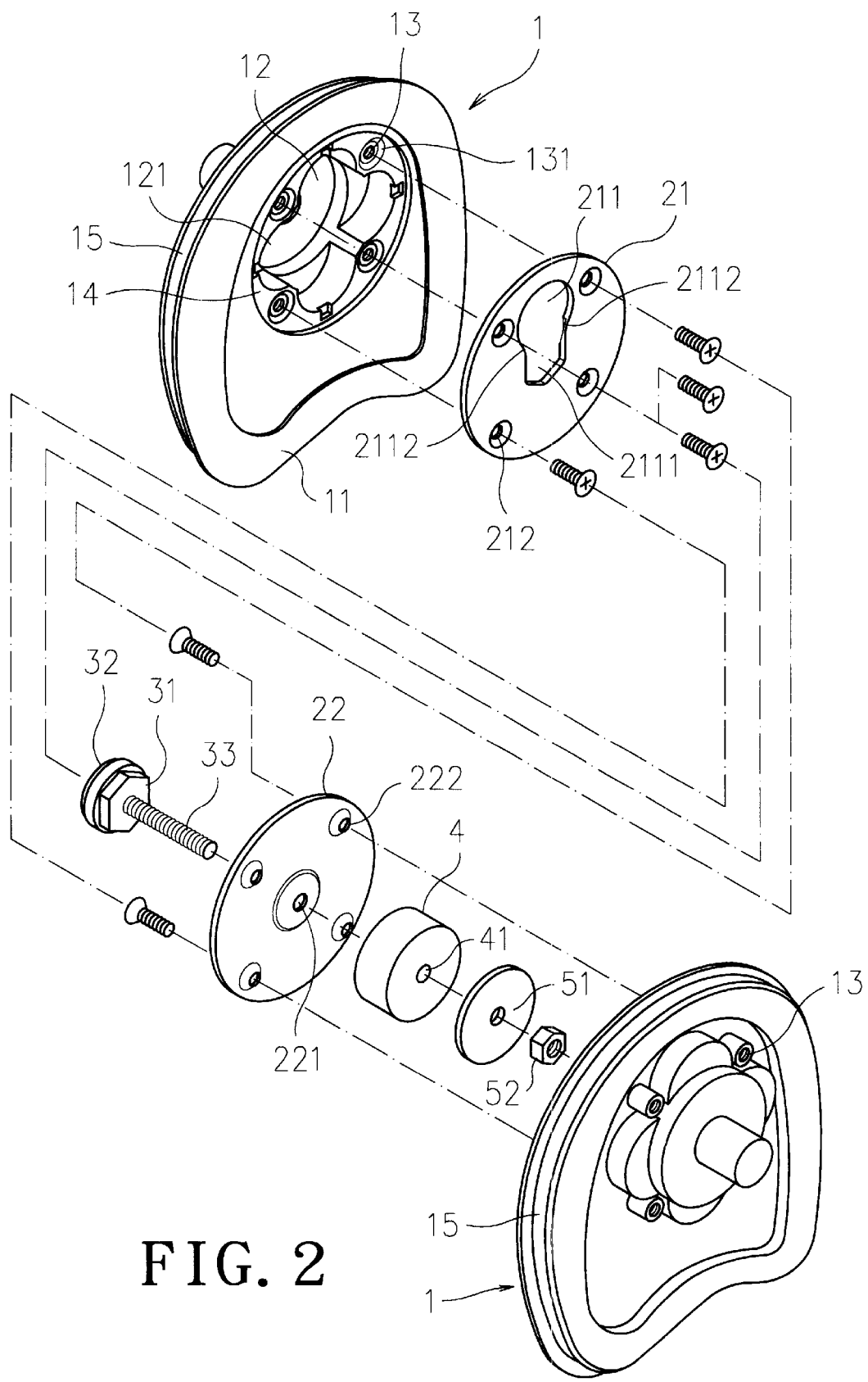
FIG. 2 is an exploded perspective view of the arm connection apparatus for an artificial model shown in FIG. 1.
Figure 4:
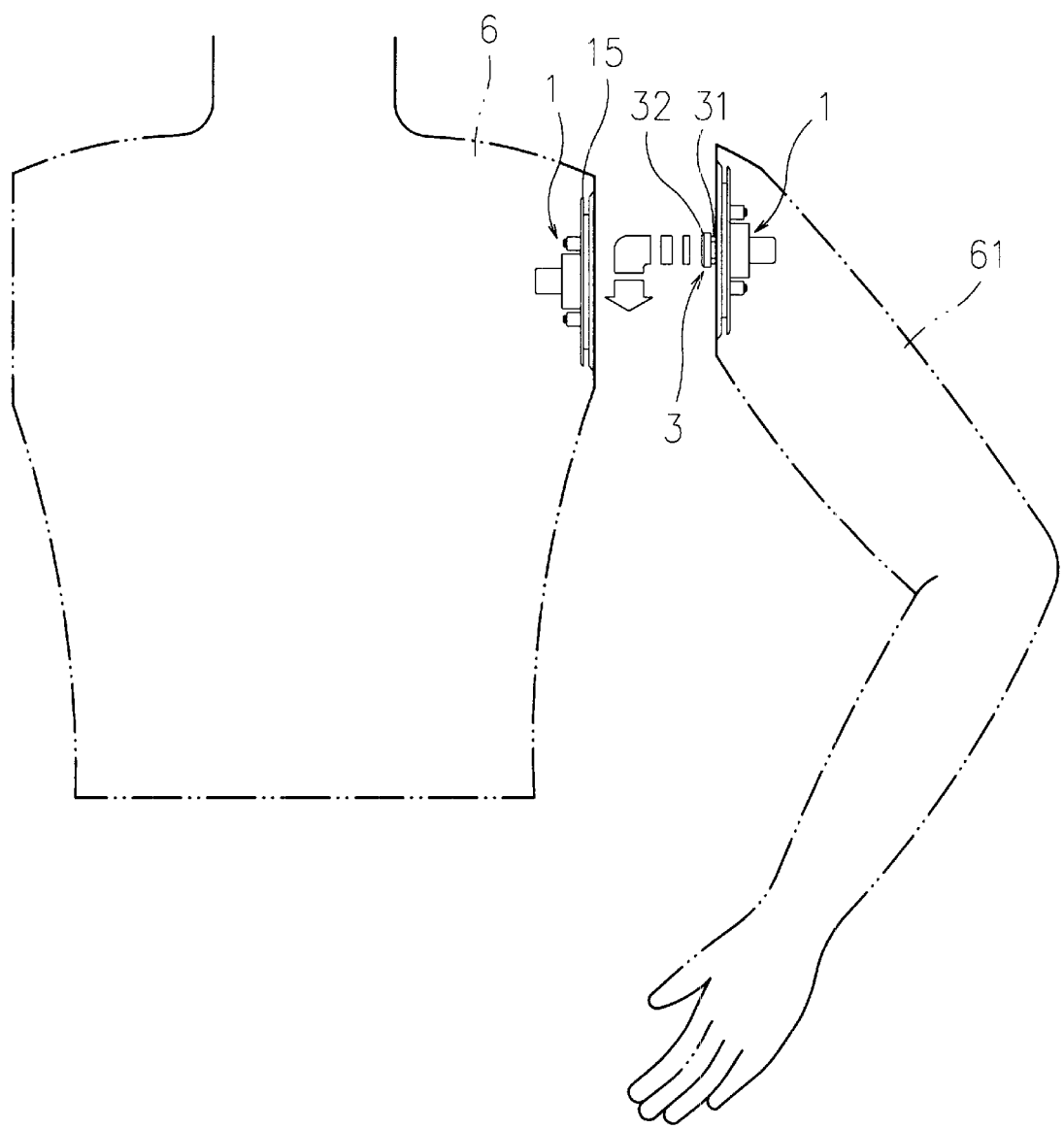
FIG. 4 is a plan view illustrating the arm connection apparatus for an artificial model in the process of assembling.

Referring to FIGS. 1, 2, and 4, an arm connection apparatus for an artificial model comprises two flat bases 1, 1, a lock disk 21, a fixing disk 22, a lock bolt 3, a washer 51, and a nut 52.

Wherein, said two flat bases 1, 1 provide a standardized fitting device 15 surrounding the bases to fit with the shoulder part 6 and the arm 61 respectively. The bases 1, 1 are identical and arranged to dispose facing to each other. Each base 1 at the periphery thereof is surrounded with an annular touching projection 11 so as to keep contact with each other while the arm connection apparatus is in use. A locating annular recess 14 is provided at the central part of each base 1 respectively, and a recess hole 12 is arranged at the central position of the annular recess 14 and is surrounded by the annular recess 14. The recess hole 12 at the contour thereof provided with a plurality of circular arc parts 121 to form a shape like a plurality of petals adjacent to each other. A periphery surrounding the recess hole 12, which is next to the annular recess 14, is provided with a plurality of threaded fixing holes 13 and each threaded fixing hole 13 at a head end thereof provides an arc recess 131.

Figure 8:
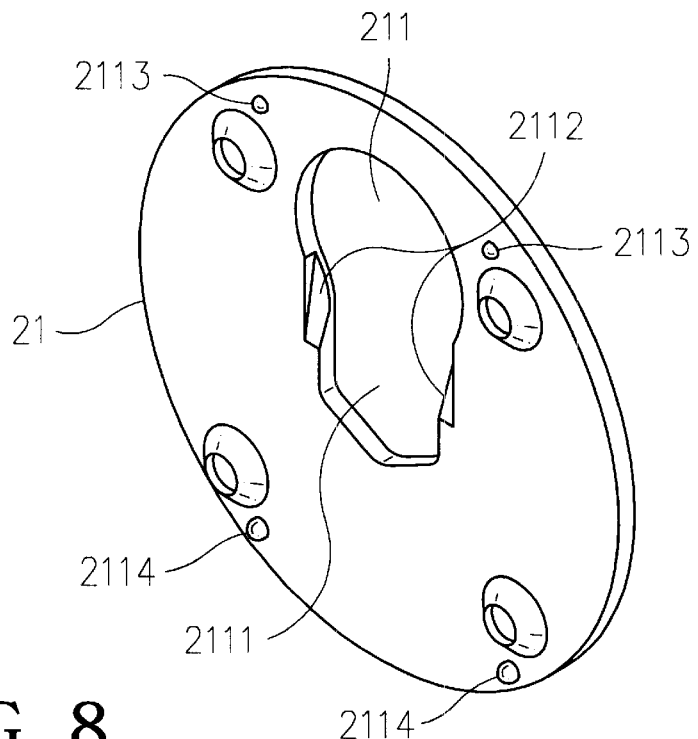
FIG. 8 is a perspective view of a lock disk in the arm connection apparatus of the present invention.
Figure 9:
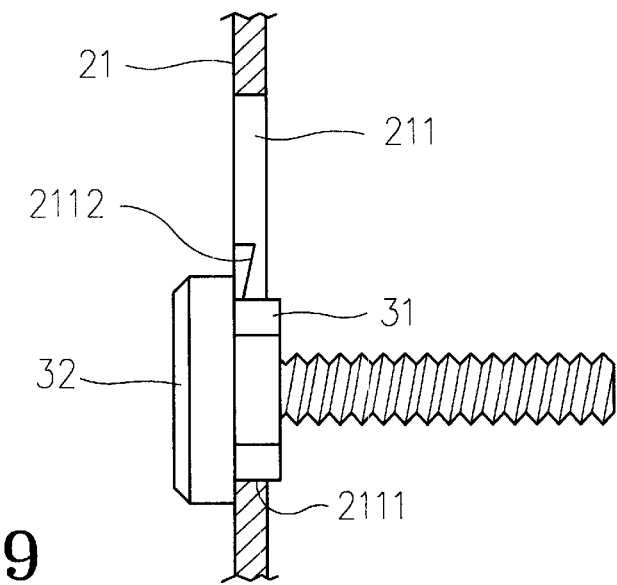
FIG. 9 is a fragmentary sectional view of the lock disk shown in FIG. 8 in a state of locking.

The lock disk 21 is a circular disk and provides a lock hole 211 at the central part thereof, and the lock hole 211 extends a polygon hole section 2111 with a width thereof being less than the diameter of the lock hole 211 such that the periphery of the lock hole 211 and the polygon hole section 2111 intersects to constitute two junctions. The lock disk 21 near the periphery thereof provides a plurality of fitting holes 212 spacing apart circumferentially and corresponding to the fixing holes 13. The junctions at the intersections of the lock hole 211 and the polygon hole section 2111 have a sharpened spot 2112 respectively as shown in FIG. 8. Further, the lock disk 21 at a side thereof provides a plurality of raised points 2113, 2114 near the periphery of the lock disk 21. It is noted that the raised points 2113 are next to the lock hole 211 and the raised points 2114 are away the lock hole 211 and near the polygon hole section 2111. The raised points 2113 have a height greater than that of the raised points 2114 such that a slope may forms as soon as the lock disk 21 fits with the annular recess 14 and the raised points 2113, 2114 touch the annular recess 14.

The lock bolt 3 at an end thereof provides a circular insert head 32 and a polygon lock part 31 is disposed next to the insert head 32 in addition to the thread rod part. The design with regard to the slope of the lock bolt 3 makes the circular insert head 32 much easier to engage with the polygon hole part 2111 as shown in FIGS., 8 and 9. The washer 51 and the nut 52 are provided to engage with the lock bolt 3.

The fixing disk 22 has a central hole 221 and a plurality of fixing holes 222 are disposed near the periphery of the fixing disk 22 in a way of spacing apart circumferentially as the fixing holes 212 on the lock disk 21 does.

The cushion piece 4 is made of elastic material and provides a central hole 41.

Figure 3:
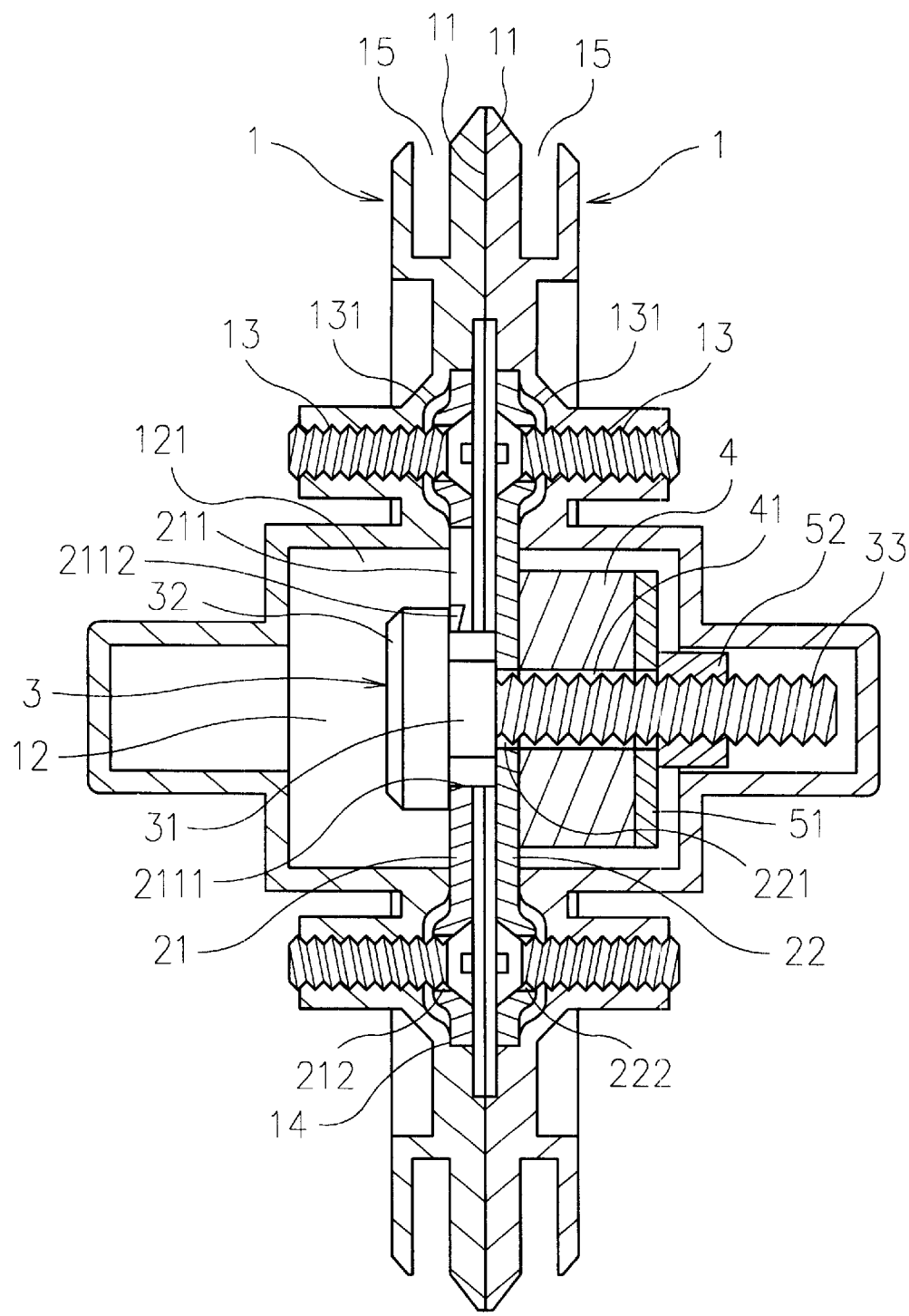
FIG. 3 is a sectional view of the arm connection apparatus for an artificial model shown in FIG. 1.

The lock bolt 3 passes through the central hole 221 in the fixing disk 22 and the central hole 41 in the cushion piece 4 such that the lock bolt 3 can be fastened to the fixing disk 22 by way of the nut 52 and the washer 51 as shown in FIG. 3.

The fixing disk 22 fits with the annular recess 14 at the other flat base 1, which is fixed to the arm 61 of the artificial model, and is fastened there by way of screws engaging with the fixing holes 222. The lock disk 21 is fastened to the annular recess 14 in the flat base 1, which is fixed to the shoulder 6 of the artificial model, by way of the screws engaging with the fixing holes 212. Thus, the lock disk 21 25 and the fixing disk 22 can face to contact with each other.

Referring to FIGS. 4 and 5 again, when the arm 61 is treated to connect the shoulder part 6, the base 1 with the fixing disk 22 and the lock bolt 3 attached to the arm 61 is approached to the other base 1 attached to the shoulder part 6. Then, 30 the insert head 32 of the lock bolt 3 is inserted into the lock hole 211 in the lock disk 21. Due to the recess hole 12 in the base 1 provides a contour of circular arc parts 121, the insert head 32 can be inserted into the recess hole 211 easily. Next, the polygon lock part 31 fits with the polygon hole section 2111 such that the lock bolt 3 is restricted to rotate and the entire connected arm 61 can keep at an expected posture.

Figure 5:
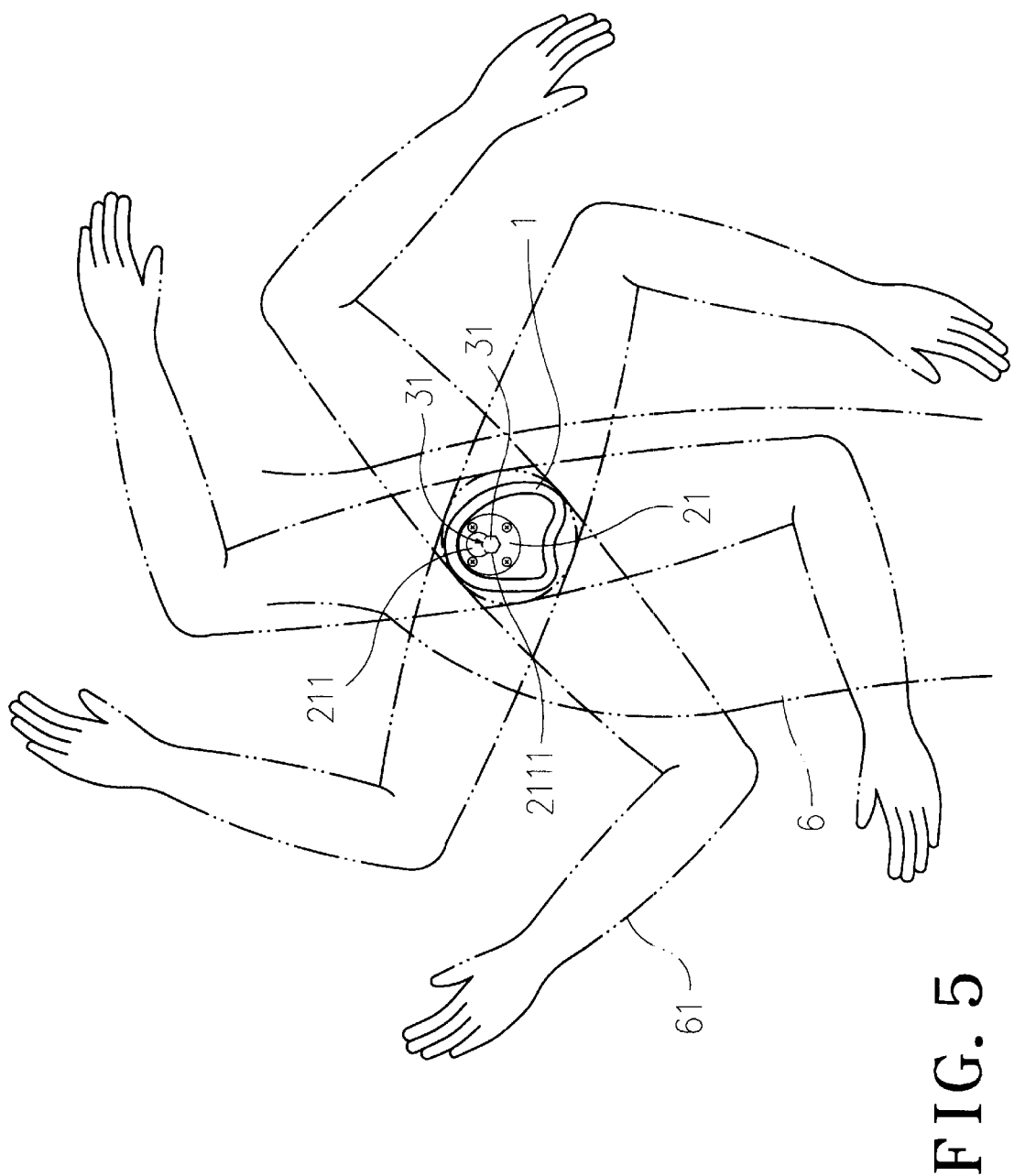
FIG. 5 is a plan view illustrating the arm connection apparatus for an artificial model in use.

Because the polygon lock hole section 2111 engaging with the polygon lock part 31 provides multiple stages of engagement, it is possible for the arm 61 to be adjusted for obtaining different postures as shown in FIG. 5. In this way, an exhibition of the artificial model can be changed flexibly.

Due to the cushion piece 4 being sandwiched between the lock bolt 3 and the fixing disk 22, the lock bolt 3 can engage with the lock hole 211 with a certain elasticity such that it is not only increase the firmness but also convenient for an operation of assembling or disassembling.

The flat bases 1 each provides a touching projection 11 surrounding the periphery thereof respectively such that a gap between the bases can be formed as soon as the two touching projections 11 contact with each other. Hence, the lock disk 21 and the fixing disk 22 keep apart without in contact so that it is not possible to result in a phenomenon of friction between two pieces of metals with rustiness.

The threaded fitting holes 13 at the head ends thereof have the arc recess 131 respectively such the lock disk 21 and the fixing disk 22 can be fastened to the bases 1 respectively with a micro adjustment when it is necessary for the arm connection.

Figure 6:
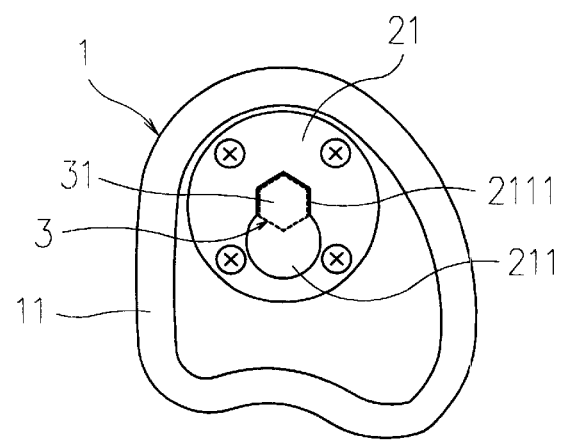
FIG. 6 is a plan view of a lock disk with a base in the arm connection apparatus according to the present invention illustrating an example of the lock disk being mounted to the base with another angular position.
Figure 7:
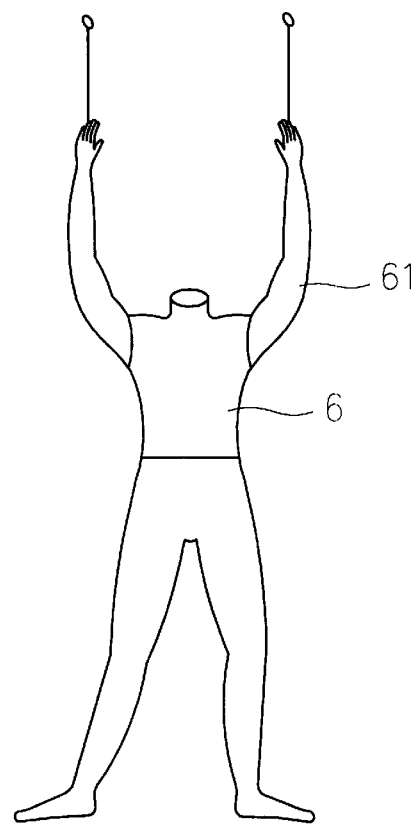
FIG. 7 is a plan view illustrating an artificial model with the arm connection of the present invention in a state of being hung up.

Furthermore, the recess hole 12 with a plurality of circular arc parts 121 makes the lock disk 21 be possible to locate at an upper angular position as shown in FIG. 6 such that the lock bolt 3 is restricted to move upward as soon as the polygon lock part 31 engages with the lock hole 211. In this way, the arms connecting with the connection apparatus of the present invention may loose apart from the body of the model in case of the model being hung up with the arms as shown in FIG. 7. In addition, the lock disk 21 can be arranged to dispose at a certain angular position such as at the position of three o'clock or the position of nine o'clock to set the arm 61 in a state of supporting or subjecting a force such that the polygon lock part 2111 is positioned against the force subjected by the arm 61. In this way, the lock bolt 3 is resisted to retreat and prevent the arm 61 from falling down caused by loosening apart from the model.

Moreover, the parts of the arm connection apparatus can be made with standard specification such that it is easy for the arm connection apparatus of the present invention can be assembled or disassembled easily. Thus, it is possible for the arm to be replaced as desired and it is not necessary for the entire model to be sent for repair as long as the damage parts are replaced.

While the invention has been described with reference to a preferred embodiment thereof, it is to be understood that modifications or variations may be easily made without departing from the spirit of this invention, which is defined by the appended claims.

What is claimed is:

1. An arm connection apparatus for an artificial model, comprising:

a first and a second flat bases, providing a standardized fitting device to be fixedly attached to a shoulder and an arm of the artificial model respectively, each of the bases having a recess hole with a contour composed of a plurality of circular arc parts, and a plurality of threaded fixing holes being arranged to space apart circumferentially and to surround the recess hole;

a lock disk, providing a lock hole with a polygon hole section extending from the lock hole such that a diameter of the lock hole being greater than a width of the polygon hole section, and having a plurality of fixing holes corresponding to the threaded fixing holes surrounding the recess hole so as to be fastened to the first flat base;

a fixing disk, providing a central hole and a plurality of fitting holes too, and being fastened to the second flat base; and a lock bolt with an end, the end providing a circular insert head and a polygon lock part next to the insert head, extending a threaded rod part from the polygon lock part, and being fastened to the fixing disk by way of a nut with a washer;

whereby, once the insert head of the lock bolt is inserted into the lock hole of the lock disk successfully due to the circular arc parts of the recess hole in the first base, the lock bolt is pushed toward the polygon hole section such that the polygon lock part of the lock bolt engages with the polygon hole section to connect the arm to the shoulder with an expected posture.

2. The arm connection apparatus for an artificial model according to claim 1, wherein both of the bases at a side facing each other provides an annular touching projection surrounding the peripheries thereof respectively.

3. The arm connection apparatus for an artificial model according to claim 1, wherein the basses each have a locating recess therein at the middle portion thereof respectively.

4. The arm connection apparatus for an artificial model according to claim 1, a cushion piece made of elastic material may be added between the fixing disk and the lock bolt.

5. The arm connection apparatus for an artificial model according to claim 1, wherein the threaded fitting holes at a head end thereof provide an arc recess respectively.

6. The arm connection apparatus for an artificial model according to claim 1, wherein two junctions at the intersections of the lock hole and the polygon hole section have a sharpened spot respectively.

7. The arm connection apparatus for an artificial model according to claim 1, wherein the lock disk provides a plurality of raised points and part of the raised points are nearby the lock hole and rest of the raised points are nearby the polygon hole section with a height thereof shorter than the part of the raised points near the lock hole.

* * * * *